R. M. BANKS.
HYDROGEN SULFID GENERATOR.
APPLICATION FILED JAN. 5, 1915.

1,170,953.

Patented Feb. 8, 1916.

Witnesses

Inventor
R. M. Banks
By P. A. Blair
Attorney

UNITED STATES PATENT OFFICE.

REGINALD M. BANKS, OF NEW YORK, N. Y.

HYDROGEN-SULFID GENERATOR.

1,170,953.  Specification of Letters Patent.  Patented Feb. 8, 1916.

Application filed January 5, 1915. Serial No. 619.

*To all whom it may concern:*

Be it known that I, REGINALD M. BANKS, a citizen of the United States of America, residing at New York, in the county of New York and State of New York, have invented certain new and useful Improvements in Hydrogen-Sulfid Generators, of which the following is a specification.

This invention relates to gas generators and in its more intense aspect to laboratory apparatus for generating such gases as hydrogen sulfid or carbon dioxid or similar important reagents used in chemical analysis.

One of the objects of the present invention is to provide a simple and practical generator of the above general character which will be inexpensive to manufacture.

Another object is to provide a self-contained gas generator for laboratory use which will be substantially automatic in its operation.

A further object is to provide a generator of the above character which will be more efficient and reliable in use and operation and permit of more rapid absorption of the gases generated by the solution to be treated.

Other objects will be in part obvious from the annexed drawing and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1:
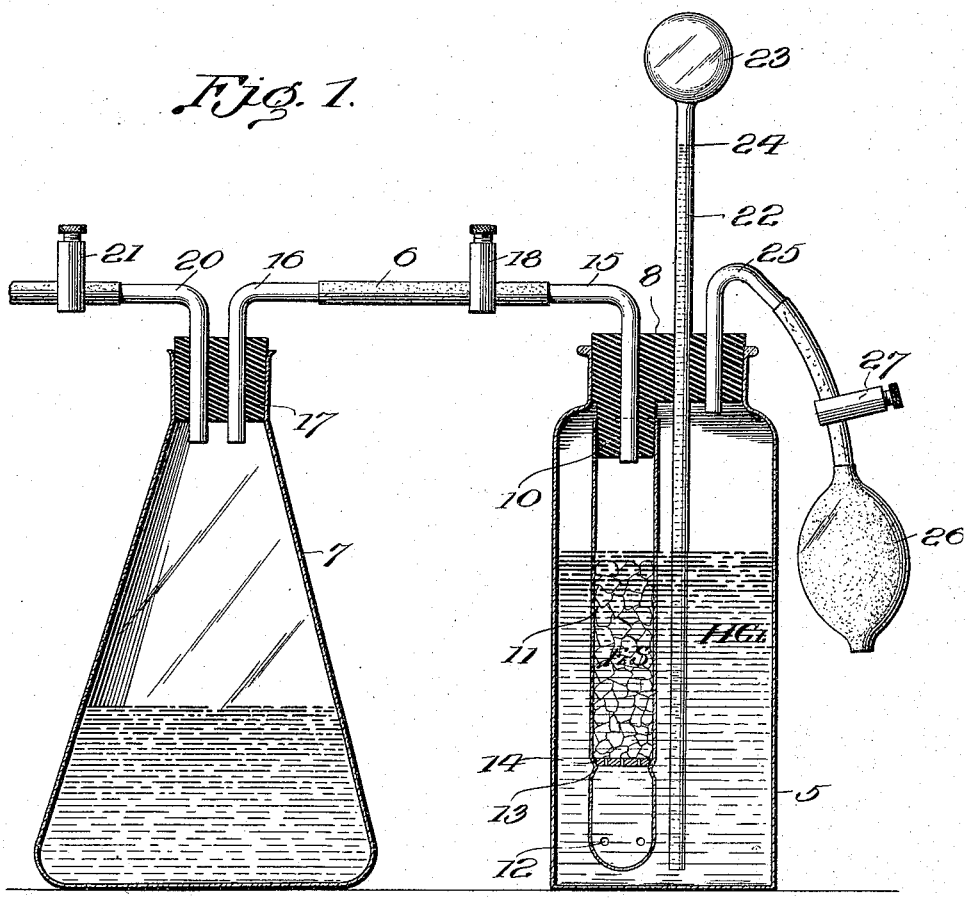
Figure 2:
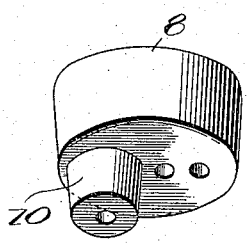

Figure 1 is a diagrammatic view of the complete apparatus in elevation; Fig. 2 is a perspective view of one of the parts looking from the under side.

In order that a clear understanding of the present invention and a full perception of the numerous objects sought to be attained may be had, the invention will be hereinafter described with relation to its application in the production of hydrogen sulfid ($H_2S$), although it is, of course, to be understood that the present invention is not to be limited to this use or application, as other reagents and gases may be produced thereby.

Heretofore in treating solutions with hydrogen sulfid, it has generally been customary to allow the gas generated to bubble up through the solution to be saturated or treated. The present invention, however, is directed toward the feature of supplying the gas under pressure to the solution to be treated or precipitated and confined in a closed receptacle thereover. The gas thus confined is more readily absorbed and the rate of absorption is more rapid, among other advantages, than by the method above referred to.

Referring now to the accompanying drawing, there is denoted at 5 a generator which may be in the form of a relatively tall wide mouthed flask or bottle which is connected by means of a flexible tube 6 with a second flask or bottle 7 containing the solution to be treated either by saturation or to cause precipitation. The generator 5 is provided with a specially designed stopper 8 provided with a plurality of openings, as will be hereinafter more specifically referred to and a depending cylindrical lug 10. This peculiar form of stopper serves the purpose of two superimposed stoppers and being formed or cast in a single piece, thereby reduces the cost of manufacture or installation of the present device. The depending lug 10 may be slightly tapered, whereby it may be more securely forced into the upper end of tube 11. This tube differs from the ordinary tube in being made of heavy glass and is provided at its lower end about a quarter of an inch above the bottom with a plurality of holes. About one inch from the bottom the tube is provided with a constriction flange 13 adapted to support a perforated porcelain disk 14 which in turn supports the iron sulfid. The stopper 8 and depending lug 10 are provided with a through opening in which is placed a glass L-shaped vent tube 15 connected with the flexible tube 6, the opposite end of which is in turn provided with a second L-shaped glass tube 16 passing through a perforated stopper 17 in the neck of the precipitating flask 7. A pinch valve 18 is provided in the tube 6 and an outlet 20 from the flask 7 is also provided with a pinch valve 21. Through another of the holes in the stopper 8 of the generator passes a tube 22 open at the bottom and having a spherical air chamber 23 at the top adapted to serve as a pressure gage. The height to which the acid, with which the generator 5 is partly filled, will be forced up into this tube is proportional to the pressure within the generator. As indicated in the drawing, the acid has been forced up to the point 24 assuming the pressure within the generator to be substantially twenty pounds. The third opening in the rubber stopper 8 is provided with a bent tube 25 to which is attached a source of air supply such as a rubber atomizer bulb 26. The usual valves in this bulb 26 will not hold pressure for any considerable length of time by themselves and it is therefore desirable to apply a pinch valve 27 to the intervening tube to prevent a loss of air pressure through the bulb. It will, of course, be understood that by opening the valve 27 a gradual release of the pressure will take place within the generator 5, if such is desired.

The operation of this device in the generation of hydrogen sulfid is substantially as follows: Assume the generator 5 to be connected with the precipitating flask 7 in substantially the manner shown and the test tube 11 filled with iron sulfid and acid up to substantially the point indicated. With the pinch valves 18, 21 and 27 open, the acid will, of course, completely cover the sulfid within the tube having entered through the holes 12 in the bottom and immediately begin to react thereon to generate the gas. The pressure indicator 22 will under these conditions indicate atmospheric pressure. As the gas is generated, it will pass through the tube 6 and soon displace the air contained in the flask 7 by forcing the same out through the tube 20. When this has been accomplished, the pinch valve 21 is closed and the gas which continues to be evolved will pass over to the flask as before, but having no outlet will exert a back pressure which will presently force the acid downwardly out of the tube 11 until the level of the acid is below the perforated disk 13. The evolution of the gas will then cease as the acid is no longer in contact with the sulfid. The air pump 26 is now operated to force air into the generator bottle 5, thereby to force the acid up into the tube 11 and cause a further generation of the gas. Another equilibrium will, however, soon be established but at a materially higher pressure which pressure will be indicated in the tube 22. By repeating this operation any desired pressure may be easily obtained.

It is, of course, to be understood that as the gas within the precipitating flask 7 is absorbed, there will be a diminution of the back pressure of the gas in the generator which will allow the acid to rise in the tube 11 and evolve more gases thereby to bring the pressure again up to the desired point. It will thus be seen that the equilibrium of pressure will be automatically maintained within the generator at any desired point.

It is to be understood that I do not depend upon the exact structure herein shown nor limit myself to the use of air as a medium of pressure within the generator for if desired, the tubes 6 and 25 could be connected by a by-pass for conveying the hydrogen sulfid back into the bottle at the point where the air is introduced, thereby to accomplish substantially the same result.

The present apparatus is believed to be exceedingly simple in construction and in operation, the parts are inexpensive to manufacture and convenient to assemble and having the test tube 11 constructed in the manner shown with the openings 12 materially above the bottom any small pieces of sulfid which drop through the perforations in the disk 14 will be caught thereby and still permit of the gas evolved by their decomposition being received at its proper destination. The present invention is, therefore, believed to accomplish, among others, all of the objects and advantages above set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In a self-contained automatically operating gas generator, in combination, a generating flask, a stopper therefor, a container tube supported therefrom, a valved outlet from said container tube, a source of gaseous fluid pressure connected with said generator flask, said container tube being open at its lower end whereby the acid may alternately be forced up therein through the lower end by said gaseous fluid pressure in the generator flask and forced downwardly therein by the reactive pressure of the gas generated and contained in said container tube.

2. In a self-contained automatically operating gas generator, in combination, a generating flask, a stopper therefor, a container tube supported therefrom, a valved outlet from said container tube, a source of gaseous fluid pressure connected with said generator flask, said container tube being open at its lower end whereby the acid may alternately be forced up therein through the lower end by said gaseous fluid pressure in the generator flask and forced downwardly therein by the reactive pressure of the gas generated and contained in said tube, and a valve between the source of gaseous fluid pressure and generator flask whereby the pressure may be maintained substantially constant in the generator flask and the gases automatically and regularly generated therein.

3. In a self-contained gas generator, in combination , a generator flask, a tube open at its lower end within said generator flask adapted to contain gas evolving material and having a valved outlet at its upper end, and means for increasing the pressure in said generator flask.

4. In a self-contained gas generator, in combination, a generator flask, a tube open at its lower end within said generator flask adapted to contain gas evolving material and having a valved outlet at its upper end, and means for supplying a gaseous fluid under pressure to said generator flask to force the acid therein up through the lower end of said tube.

5. In a self-contained gas generator, in combination, a generator flask, a stopper therefor having a body portion and an integral depending lug to which a tube may be attached and having an opening through the stopper body and lug.

6. In a self-contained gas generator, in combination, a generator flask, a stopper therefor having a body portion and an integral depending lug to which a tube may be attached and having an opening through the stopper body and lug and a tube adapted to be suspended from said lug for holding a gas evolving body therein.

7. In a self-contained gas generator, in combination, a generator flask, a stopper therefor having a body portion, an integral depending lug to which a tube may be attached and having an opening through the stopper body and lug, and a tube adapted to be suspended from said lug for holding a gas evolving body therein, said tube having a perforation near its lower end adapted to permit the acid contained in the generating flask to flow therethrough.

8. In a self-contained gas generator, in combination, a generator flask, a stopper therefor having a plurality of through openings, a member adapted to contain a gas evolving material having a gas outlet at its upper part communicating with one of said openings, a source of gaseous pressure supplying fluid communicating with another of said openings and a pressure gage mounted in a third opening adapted to indicate the gaseous pressure within said generator.

9. In a self-contained gas generator, in combination, a generator flask, a stopper therefor having a plurality of through openings, a member adapted to contain a gas evolving material having an outlet at its upper part communicating with one of said openings, a source of gaseous pressure supplying fluid communicating with another of said openings, a pressure gage mounted in a third opening adapted to indicate the gaseous pressure within said generator, a valve associated with the outlet of said container, and a valve associated with the source of gaseous fluid pressure.

10. In a self-contained automatically operating gas generator, in combination, a generating flask, a source of fluid pressure connected with said generating flask, a container for gas generating material in said generating flask having an opening near its lower end whereby a coactive fluid reagent in said generating flask may be alternately forced up through said opening on increasing the pressure therein to react on the acid forming material and forced out through said opening by the reaction of the gas generated and contained in the container for gas generating material whereby the pressure in said container is automatically maintained at a substantially constant pressure.

In testimony whereof I affix my signature in presence of two witnesses.

REGINALD M. BANKS.

Witnesses:
HAROLD P. BANKS,
EDWARD B. BRUCH.

Copies of this patent may be obtained for five cents each, by addressing the "Commissioner of Patents, Washington, D. C."